United States Patent [19]

Werges et al.

[11] 3,894,084

[45] July 8, 1975

[54] PROCESS FOR MAKING ACRYLAMIDE

[75] Inventors: Darrell L. Werges, Park Forest; Louis A. Goretta, Naperville, both of Ill.

[73] Assignee: Nalco Chemical Company, Chicago, Ill.

[22] Filed: Apr. 5, 1974

[21] Appl. No.: 458,434

[52] U.S. Cl......... 260/561 N; 252/477 Q; 260/557 R
[51] Int. Cl............................................. C07c 103/08
[58] Field of Search......... 260/561 R, 561 N, 557 R; 252/463, 476, 477 Q; 75/139

[56] References Cited
UNITED STATES PATENTS
3,766,088  10/1973  Yoshimura et al. ............ 260/561 N
3,767,706  10/1973  Habermann et al. ........... 260/561 N OTHER PUBLICATIONS
Chem. Abs., 79, 67046u, (1973).
Chem. Abs., 79, 3238Ha, (1973).

*Primary Examiner*—C. Davis
*Attorney, Agent, or Firm*—Hill, Gross, Simpson, Van Santen, Steadman, Chiara & Simpson

[57] ABSTRACT

A process for catalytically hydrolyzing acrylonitrile to acrylamide. A reactor is filled with a desired quantity of water and a copper catalyst is suspended therein with agitation. Acrylonitrile is added incrementally over a time period conservatively selected to stay within the cooling limits of the reactor. After the acrylonitrile is so added, it is held for an additional time period in the reactor. Thereafter, agitation is stopped, the catalyst falls to the bottom of the reactor, and an acrylamide solution is decanted off the top of the reactor. The sequence of steps is repeatable using the same copper catalyst.

16 Claims, 2 Drawing Figures

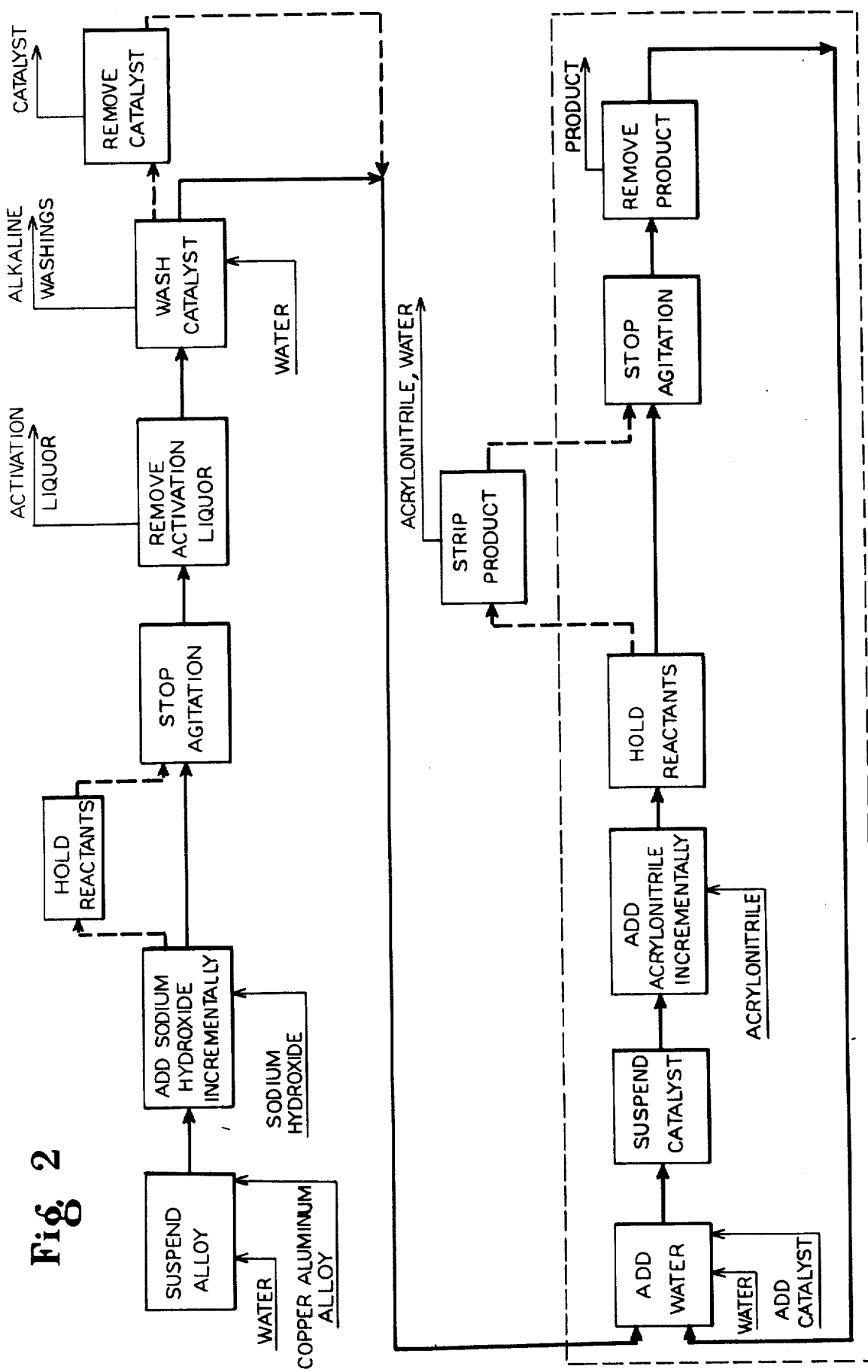

PROCESS FOR MAKING ACRYLAMIDE

BACKGROUND OF THE INVENTION

To make acrylamide from acrylonitrile by catalytic hydrolysis under aqueous liquid phase conditions using conventionally available batch-type reactors at rates which can be commercially useful has heretofore generally not been possible. Instead, various types of fixed catalyst bed and suspension bed continuous and semi-continuous processes have heretofore been developed which require considerable amounts of capital for plant and equipment. See, for an example of a suspension bed process, the Mitsui Toatsu Chemicals Ger. DOS. No. 2,240,783.

There is a need in this art for a nitrile to amide conversion process which will enable one to use such conventional type reactor vessels under conditions such that batch cycle times may be minimized, a particular catalyst charge may be repetitively reused, acrylonitrile may be converted to acrylamide at reasonably rapid reaction rates within safe equipment operating limitations, and acrylamide may be produced at high total conversion, thus providing the capability of making a concentrated acrylamide solution product using batch conditions, such product requiring little, or a minimum of, acrylonitrile stripping before subsequent usage.

SUMMARY OF THE INVENTION

By the present invention, there is provided a new and highly efficient process for catalytically hydrolyzing acrylonitrile to acrylamide using conventionally available kettle-type reactor equipment. The process is believed to avoid the shortcomings and limitations of prior art processes and to provide process economies and features comparable in many ways to previous continuous processes requiring specialized equipment. The process is adapted to be operated using minimum cycle times, rapid control of hydrolysis rates, high total conversions of nitrile to acrylamide, and the process is safe and convenient to utilize. In particular, the process employs certain economies, such as permitting one to reuse repetitively a particular copper catalyst for a number of individual batches sequentially.

One outstanding feature of the process of this invention is the fact that it permits one to repetitively use the same solid catalyst particles for an indefinite number of reaction batch cycles without changing or adding to such catalyst particles.

Another feature of this process is that one can use conventional kettle-type reactor equipment to not only hydrolyze the acrylonitrile to the acrylamide, but also to remove the product solution to acrylamide from such reactor without removing any substantial quantity of catalyst particles from the reactor.

Another feature is that if desired, one can generate (activate) in situ in such a reactor catalyst particles for subsequent rise in the hydrolysis process without ever removing such particles from the reactor thus permitting greatly simplified and highly economical operation while protecting the catalyst from exposure to air (oxygen).

Another feature is that one can, if desired instead of discharging from such reactor a product which contains all of the remaining, unconverted acrylonitrile, directly strip and cool a hydrolyzed product solution before withdrawings a purified acrylamide product solution from the reactor to remove therefrom substantially all, or a part of, such unreacted acrylonitrile, the catalyst particles being substantially retained inside the reactor as the thus purified product solution of acrylamide is removed from the reactor.

Another feature is that the acrylonitrile is incrementally fed to the reaction zone to control the rate of heat release of the hydrolysis reaction within equipment limitations, as desired.

Another feature is that, when a Raney copper catalyst is prepared in situ, the alkali metal hydroxide addition rate may be incremental to control the heat release generated by the reaction of alkali metal hydroxide with copper/aluminum alloy particles within equipment limitations, as desired.

Other and further objects, purposes, advantages, aims, utilities and features will be apparent to those skilled in the art from a reading of the present specification and drawings.

BRIEF DESCRIPTION OF DRAWINGS

In the drawings:

FIG. 2 is an activity diagram illustrating the practice of the present invention.

DETAILED DESCRIPTION

Figure 1:
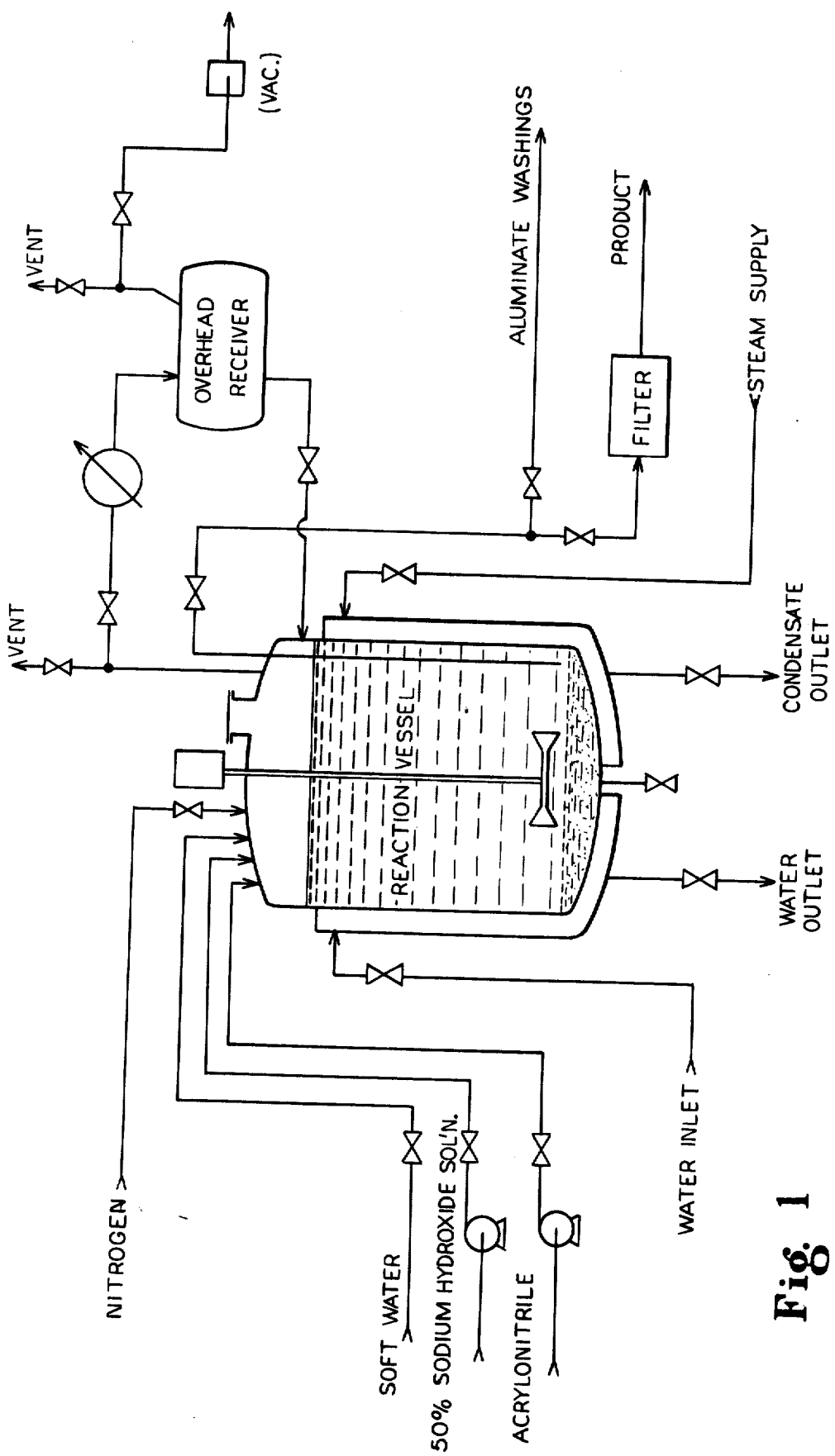
FIG. 1 is a schematic diagram of one embodiment of apparatus suitable for the practice of the present invention.

More particularly the present invention is directed to a process for preparing acrylamide from acrylonitrile by catalytic hydrolysis under aqueous liquid phase conditions. In a first step, one suspends with agitation in water contained in a reaction zone copper catalyst particles having a standardized nitrile hydrolysis activity of at least about 50 weight percent. Such particles are further characterized by having a particle size ranging from about 0.002 to 0.1 inches in average diameters and preferably from about 0.005 to 0.02. The weight ratio of said catalyst to said water ranges from about 0.02 to 0.20, and preferably from about 0.05 to 0.1.

Next, to the agitated system (water plus suspended said catalyst particles) maintained at an initial water temperature ranging from about 180° to 300°F (preferably about 200° to 250°F) one adds incrementally acrylonitrile. The rate of such addition is such that the temperature of said water is maintained in the range of from about 180° 300°F (preferably from about 200° to 250°F). The total amount of acrylonitrile so added is such that the weight ratio of said water to said total acrylonitrile ranges from about 50:50 to 75:25 (preferably, about 60:40 to 70:30). Such rate of addition is such as to produce a total conversion of acrylonitrile to acrylamide in said reaction zone of at least about 45% and preferably about 60 % at the time when said adding is completed.

After the addition of acrylonitrile is completed one holds (maintains) the resulting mixture in said reaction zone with agitation at a water temperature ranging from about 180° to 300°F until the total conversion of such added acrylonitrile to produced acrylamide is at least about 65% and preferably about 80%.

After such a hold period, agitation is terminated in the reaction zone, thereby causing said catalyst particles to fall to the bottom of the reaction zone.

In one more preferred mode of practicing the process of this invention, the rate of addition of acrylonitrile to the water in the reaction zone is so regulated that the incremental addition of acrylonitrile is such that conversion to acrylamide in the reaction zone reaches at least about 65% by the time acrylonitrile addition is completed, other reaction variables being as described above. In this mode, a hold period following acrylonitrile addition is not needed (but may be employed, of course, if one desires). This mode is conveniently employable when using a catalyst having a relatively high acrylonitril hydrolysis activity. In general, to practice the process of the present invention a preferred standardized acrylonitrile hydrolysis activity falls in the range of from about 70 to 95 weight percent though higher values may be employed, as those skilled in the art will appreciate. Similarly, in general, the total conversion of acrylonitrile to acrylamide in the reaction zone (based on total added acrylonitrile and produced acrylamide) preferably falls in the range of from about 65 to 80% though higher total conversions may be achieved as those skilled in the art will appreciate.

As used herein the term "incremental" in relation to addition has reference to continuous or discontinuous charging, as those skilled in the art will appreciate. For present process purposes continuous charging is preferred. The acrylonitrile is so added to the water in the reaction zone in any convenient manner.

For purposes of this invention, standarized nitrile hydrolysis activity of a given group of copper catalyst particles used in the process of this invention is determined by the following test procedure: a stainless steel reaction vessel having an internal volume of approximately 2 gallons is equipped with an internal agitation and an electrical heating jacket. The electrical heating jacket is automatically controlled to allow maintaining the vessel contents at a preselected temperature.

When using the described reaction vessel, it is charged at room temperature with 9.0 pounds of water, 3.0 pounds of acrylonitrile, and 0.6 pounds (dry weight basis) of the catalyst being tested. The contents of the vessel are rapidly heated with the electrical jacket to 218°–222°F, and maintained at this temperature for 3 hours. At the end of 3 hours a sample is withdrawn and analyzed by gas chromatography to determine the weight percentage conversion of acrylonitrile to acrylamide. The percentage conversion of acrylonitrile to acrylamide determined from this sample is defined as catalyst activity.

For purposes of this invention, the term "copper catalyst" has reference to any copper containing solid material having a particle size range as indicated and having a standarized nitrile hydrolysis activity as indicated. Such a copper containing material characteristically contains at least about 50 weight percent (total weight basis) of copper, with balance up to 100 weight percent thereof being some other material, such as aluminum (as in Raney copper catalysts), oxygen, nickel, chromium, silicon, and other known metal and non metallic constituents commonly employed in copper catalysts, as those skilled in the art will appreciate. Chemically pure electrolytic copper powder, however, does not appear to have a standardized nitrile hydrolysis activity which is sufficiently great to be of value for use in the present invention. Raney copper is a preferred copper catalyst for use in this invention.

In one mode of practicing the present invention, the Raney copper catalyst used in the hydrolysis reaction is prepared in situ in the reactor (reaction zone) used to subsequently carry out the hydrolysis of nitrile to amide. Thus, prior to the start of the hydrolysis aspect, one charges water to the reaction zone. Along with the water or subsequently, one charges to the reaction zone an alloy comprising copper and aluminum in a weight ratio of from about 30:70 to 70:30 copper to aluminum in the form of particles having a size ranging from about 0.002 to 0.1 inches in average maximum diameter to said reaction zone to produce an initial weight ratio of said alloy particles to said water in the range from about 0.01 to 0.35. The alloy particles are suspended in the water with agitation.

Next, one adds alkali metal hydroxide (preferably but not necessarily dissolved in water) to such suspension while maintaining the bulk temperature of said water in the range from about 32° to 180°F. (preferably from about 60° to 120°F). The total quantity of alkali metal hydroxide charged to such suspension ranges from about 0.5 to 20 times (preferably from about 1.0 to 3.0 times) the number of moles of aluminum initially present in said alloy. The total time of such adding ranges from about 2 to 30 hours (preferably from about 4 to 20 hours).

Afterwards, one terminates such agitation in such reaction zone, thereby causing such catalyst particles as prepared from the alloy particles to fall to the bottom of such reaction zone.

Thereafter, one removes the water with residual alkali metal hydroxide contained therein, and one washes with water said catalyst particles until a wash water pH not above about 8.0 is achieved.

In a preferred mode, after said adding is completed, the resulting solution of alkali metal hydroxide is maintained in contact with said particles while so suspended until at least about 35 weight percent of said aluminum initially present in said alloy on a 100 weight percent total initial alloy basis is removed thereby to produce catalyst particles from said alloy particles.

A special feature of a process of this invention lies in the fact that the sequence of steps of suspending catalyst particles in water, incrementally adding acrylonitrile, maintaining the resulting mixture in the reaction zone, terminating agitation, removing the acrylamide product solution and recharging the reaction zone with water can be repeated a plurality of times using the identical catalyst particles at least five times, if desired, and preferably at least 10 times and more preferably at least 15 times.

Initially, copper catalyst particles are laying on the bottom of the reactor, preferably under perhaps several or more inches of water. Because of their relatively high density, the catalyst particles occupy characteristically a relatively small percentage of the reactor volume. The catalyst particles will not occupy more than about 7% of vessel volume, and more typically occupy about 1–3% of vessel volume. The catalyst particles may have been generated in situ by a prior activation (as indicated), they may be remaining and be ready for reuse after a prior hydration (as also described later), or they may have been generated externally and charged manually through a reactor manway using a hand scoop or the like. The catalyst particles could also be manufactured in another vessel and pumped in as a slurry in water.

The total water charge is introduced into the reactor before or after the catalyst is present in the reactor. The water preferably should be softened or deionized. The water could be deaerated and preheated before charging, but such is not necessary. While the water could in part be also added later, no great advantage appears to exist for this route, and it could cause problems due to inadequate agitation with some agitator designs due to the low fluid level in a reactor vessel.

Before starting the reactor's agitator, it is preferred, though not necessary, to deaerate the water. This can be accomplished by, for examples, the following alternates:

a. Heat the water to boiling with steam to the vessel jacket or coils;
b. sparge vessel contents with nitrogen through a lance or distributor above catalyst, and/or
c. pull a vacuum of at least 50 mm on the reactor vessel.

After deaerating, the agitator can be started. At this point, it is highly preferable to remove a large percentage (e.g., 80 to 90% by weight) noncondensible gasses from the vessel to prevent compressing such between the vessel liquid level and the top vessel head while pumping in acrylonitrile in the addition step. This evacuation can be accomplished, for example, by the following alternates:

a. Boil the water in the vessel for 15 to 30 minutes, venting the steam and thus purging out noncondensibles with steam (logically, a continuation of deaeration by boiling), or
b. pull a vacuum on vessel and break with nitrogen several times to both eliminate residual oxygen and minimize noncondensibles.

The catalyst particle size is in average diameter broadly from about 0.001 to 0.1 inches, preferably about 0.005 to 0.02 inches. The weight ratio of total catalyst particles to total water charged is broadly from about 0.02 to 0.2, and preferably from about 0.05 to 0.1.

After blocking in all openings to the reactor, the system of catalyst particles in such water slurry is preheated to a reaction temperature, which is generally from about 180° to 300°F, and preferably from about 200° to 250°F.

The acrylonitrile addition, typically by pumping now begins. The acrylonitrile preferably is deaerated, but not necessarily so. It can also be preheated, but no particular process advantage exists for preheating.

As indicated, the acrylonitrile pump-in rate is conservatively selected so the cooling capabilities of the particular reactor being used are not exceeded, which would result in an uncontrolled, runaway exothermic reaction. Assuming, for example, a cooling water temperature averaging about 100°F between inlet and outlet, the $\Delta T$ between the jacket and process fluid will be about 100° to 150°F for above preferred limits of reaction temperature. From Table 10-14 in "Chemical Engineer's Handbook," Edited by Perry and Chilton, 5th Edition, it is seen that liquid to liquid heat transfer coefficients typically range from about 50 to 100 Btu/hr ft$^2$ °F. Consequently, heat fluxes will range from about 50 × 100 (or about 5,000 Btu/hr ft$^2$), to 100 × 100 (or about 10,000 Btu/hr ft$^2$) through the effective jacket area. Since the heat of hydration of acrylonitrile to acrylamide is approximately −500 Btu/lb acrylonitrile, if a conservative assumption is made that the acrylonitrile reacts as fast as it is added, addition rates should preferably range from about:

$$\frac{5000}{500} = \frac{10 \text{ lbs. ACN}}{\text{ft}^2\text{hr}} \text{ to } \frac{10,000}{500} = \frac{20 \text{ lbs. acrylonitrile}}{\text{ft}^2\text{hr}}$$

based on the jacket area of the vessel. Since acrylonitrile will normally react more slowly than at the rate it is added, this calculation is conservative, as those skilled in the art will readily appreciate.

As a typical working example, a 12,000 gal. reactor having a heat transfer jacket area of approximately 500 ft.$^2$ is chosen here. Thus, if total batch size is about 100,000 lbs, and the acrylonitrile charge is 35% of the total, 35,000 lbs. acrylonitrile must be added. Taking a middle value of 15 lbs. acrylonitrile/ft$^2$hr, the addition rate becomes 15 × 500 = 7,500 lbs acrylonitrile per hour. Total addition time becomes (35,000/7,500) — 4 ⅔ hours.

Ratios of total acrylonitrile charged to total water charged broadly range from about 50:50 to 25:75, and preferably from about 30:70 to 40:60.

Acrylonitrile charging times are dependent on acrylonitrile to water ratio and reaction vessel characteristics. Values between about 2 and 10 hours will generally be typically economical for well designed reaction vessels.

For normal commercial production, a uniform acrylonitrile addition rate is most simple and practical. Non-uniform rates can be used.

The catalyst particle level in, for example, total weight percent based on total water, and temperature of reaction are controlled so that total conversion is preferably at least about 45% at the end of the acrylonitrile pump-in. Such controls of process variables are, desired to prevent a large build-up of unreacted acrylonitrile in the vessel, which could result in a runaway reaction if the temperature, somehow inadvertently is raised after the pump-in is complete. For example, the quantity of unreacted acrylonitrile in a reaction zone can be monitored quite simply by periodically withdrawing samples and observing if a lighter non aqueous acrylonitrile phase splits out after cooling to room temperature. A split indicates that conversion is below about 50%, and in such a case the pump-in should be stopped and the vessel held at reaction temperature until further samples show the split disappears at this time, pump-in is resumed.

After completing an acrylonitrile pump-in, the vessel and its contents are conveniently held at reaction temperature with agitation to maintain suspension for a sufficient time to achieve at least about 65% and preferably about 80% conversion. The hold times typically range from about 2 to 10 hours, so that total reaction times are about 4 to 40 hours. Most preferably, reaction times range from about 8 to 15 hours. Longer times are technically feasible but tend to be less economical.

The reaction temperature may be increased 10° to 40°F after reaching about 65% conversion of acrylonitrile to acrylamide to accelerate the reaction, reaction temperatures being always preferably within the previous limits indicated. A sophisticated gas chromatographic analysis of the reacting mixture would be desirable to guarantee the safety of such a temperature increase to be certain a large amount of unreacted acrylonitrile was not remaining, which could result in an uncontrolled exotherm. As a result, uniform reaction temperatures are preferred.

During the reaction period (addition plus holding) the reaction vessel will be typically under autogeneous pressures of from about 10 to 150 PSIG to maintain liquid phase conditions. Pressure will consist of the liquid vapor pressure plus pressure exerted by non-condensibles, the latter of which is preferably minimized by initially evacuating the vessel, as indicated above.

Throughout the reaction, the reaction temperature is herein controllable by generally modulating the rate of cooling water to the jacket. A larger flow of water is typically required earlier in a reaction as compared to the final stages of such reaction.

After reaching the desired conversion level, the vessel is vented through a valve at a controlled rate to a condenser, resulting in acrylonitrile and water flashing overhead. The vapors are preferably condensed and collected in an overhead receiver. After venting down to atmospheric pressure. Steam can be applied to the jacket to strip off additional acrylonitrile and water if desired. A product concentration of at least about 40% acrylamide is preferred, with a residual of not more than about 2% acrylonitrile, and preferably less.

After such a stripping, the reactor agitator is stopped, and the catalyst particles are allowed to settle to the bottom of the reactor. The time required for catalyst particles to settle is approximately predictable by Stoke's law for the terminal velocity for a particle falling through a fluid. (see Transport Phenomena, by R. B. Bird, W. E. Stewart, and E. W. Lightfoot, 1960, p.59-60). Thus, for catalyst particles of specific gravity of approximately 3 gms/cm$^3$, catalyst particles having a particle size of about 0.001 inches will have a settling rate in water of about 3 ft/hr. This would be about the minimum acceptable settling rate in commercial equipment, as this would give about a 4 hour settling time in, for example, a 12 foot high reactor. Particles having sizes at least above about 0.0016 inches in diameter (much preferred) having settling rates of about 20 ft/hr, and this gives about a 0.6 hour settling time in such a 12 foot high reactor. Settling times of one hour or less are highly preferred.

The product is then removed from the vessel through an outlet lance (tube) which has an opening which is located just above the upper surface of the settled catalyst layer in the reactor. Once the catalyst particles have substantially settled to a reaction bottom, reaction is substantially terminated. Optionally, the tip of a lance may be equipped with a filter, such as a sintered metal element. The size of the openings in the filter element can be selected to allow catalyst fines generated by attrition during their suspension to pass through. The product is then preferably passed through a second, external filter to remove substantially all particulate matter.

Based upon an overall acrylonitrile and water weight ratio, one can determine the percentage acrylamide in the final product by multiplying the percentage acrylonitrile in the overall feed composition times the weight fraction of acrylonitrile converted to acrylamide times 1.34 (which is the ratio of the molecular weight of acrylamide to the molecular weight of acrylonitrile.) Similarly, the weight percentage acrylonitrile in the final product can be estimated by multiplying the weight percentage acrylonitrile in the overall feed composition by the difference of 1.0 minus the weight fraction of acrylonitrile converted to acrylamide.

Hydrolysis of acrylonitrile in accord with the present invention is preferably employed with a catalyst containing a system such that the weight ratio of copper catalyst to nitrile ranges from about 3 to 40%.

When a catalyst is prepared thus in situ the following procedure is preferably employed. First, an alloy comprised of copper and aluminum in a weight ratio of from about 70:30 to 30:70 copper to aluminum in the form of particles having a size ranging from about 0.002 to 0.1 inches in average diameter is charged to the reaction zone (preferably the copper to aluminum weight ratio in such alloy ranges from about 45:55 to 55:45 and the particles preferably have a size ranging from about 0.005 to 0.02 inches in average maximum diameter).

Water is charged to the reaction zone to produce a weight ratio of catalyst to water in the range of from about 0.01 to 0.35 (and preferably from about 0.05 to 0.25). Next, the alloy particles are suspended in the water with agitation. The agitation should be sufficient to substantially suspend the alloy particles in the water. Excessively high agitation should be avoided as excessive attrition of particles will result.

After charging the catalyst and water to the reaction vessel the vessel is closed up except for a hydrogen vent line. The vessel is then purged with nitrogen or other inert gas to prevent explosive hydrogen and oxygen mixtures from forming in the reaction vessel after starting alkali metal hydroxide addition.

Next, one adds alkaline metal hydroxide (preferably sodium or potassium hydroxide) to the suspension while maintaining the bulk temperature of the water in the suspension in the range from about 32° to 180°F (and preferably in the range of from about 60° to 120°F). The total quantity of alkali metal hydroxide charged to such suspension ranges from about 0.5 to 20 times the number of moles of aluminum initially present in the starting alloy and preferably from about 1.0 to 3.0 times). The total time of alkali metal hydroxide addition preferably ranges from about 2 to 50 hours. In any given case, the exact time of addition is typically primarily determined by the cooling jacket capabilities of the particular reactor being used. Thus, when selecting a rate of addition of alkali metal hydroxide, one should select a rate which is within the cooling jacket capabilities of the reactor. Particularly in the initial reaction stages, the finely divided alloy/catalyst of this invention (most favored range about 0.005 to 0.02 inches) will react almost immediately with the alkali metal hydroxide as it is added. For example, if one were using the 12,000 gal reactor previously described with 500 ft.$^2$ jacket area with an average $\Delta T$ of 20°F (vessel at 130°F, cooling water at 80°F inlet and 120°F outlet), the maximum heat removal rate is $20 \times (50 \text{ to } 100) = 1,000$ to 2,000 Btu/hr ft.$^2$ As the heat of reaction is approximately 400 Btu/lb sodium hydroxide, if for example the alkali metal hydroxide is sodium hydroxide, then the maximum addition rate should be about 1,000/4,000 to 2,000/4,000 or about 0.25 to 0.5 lbs NaOH/hr ft$^2$. For the 12,000 gal reactor the addition rate is about $500 \times (0.25 \times 0.5)$ or about 125 to 250 lbs NaOH/hr. Assume a total reactor charge of about 90,000 lbs water, about 10,000 lbs NaOH, and about 13,500 lbs of 50% copper, 50% aluminum alloy, in particulate form. As this represents a 2/1 molar ratio of NaOH/Al, the first half of the NaOH must be added at a maximum rate of 125 to 250 lbs/hr, or over a time interval of (5,000/125) to (5,000/250) or 40 to 20 hours. The second half of the sodium hydroxide can be added over a much shorter interval of about 1 to 5 hours, for example, as the reaction will typically proceed relatively slowly at this juncture.

Next, one maintains the alkali metal hydroxide so added in contact with such particles until at least 80 weight percent of the aluminum initially present in the alloy (starting weight basis of alloy) on a 100 weight percent total initial alloy basis is removed thereby to produce the product catalyst particles desired for use in the practice of the process of the present invention from the starting alloy particles. The total time of addition and subsequent contacting with alkali metal hydroxide is generally in the range of from about 4 to 50 hours.

Thereafter, in one procedure, one terminates the agitation in the reaction zone, thereby causing the catalyst particles to fall to the bottom thereof, in the manner indicated. The spent leaching liquor contains excess alkali metal hydroxide and alkali metal aluminate together with suspended copper oxide fines of small particle size. These fines, which settle slowly are drawn out of the vessel through an opening slightly above the larger catalyst particles laying on the bottom of the vessel. The opening should not be equipped with a filter, as a filter is likely to clog with fines. Thereafter, the vessel is partially or totally filled with fresh, deionized or deaerated water, and the catalyst particles remaining are resuspended with agitation for a brief period of time, perhaps about 5 to 10 minutes. The agitator is then stopped, and the catalyst particles again are allowed to fall to the bottom of the vessel. The wash liquor is drawn off through the same opening as used to remove the spent leaching liquor. This procedure is repeated until the pH of the final wash liquor is less than about 8.0. Typically, about five to 10 more washings will be required, depending on the residual liquid volume which remains in the vessel after each washing. The volume of water used in the washings is not critical.

The solids loading in the activation procedure can be adjusted to give precisely the quantity of catalyst required to directly go to an acrylonitrile hydration procedure, without the necessity of catalyst handling by either making up additional catalyst or by removing some catalyst to achieve the desired hydration catalyst concentration. The quantity of catalyst produced is changed by adjusting the activation procedure conditions, primarily the alloy to water ratio. Relatively higher quantities of catalyst will be produced by higher alloy to water ratios (at constant total reactant volume).

After completing the washing, if the catalyst is to remain inside of the reaction vessel for subsequent use a nitrogen or other inert gas atmosphere is maintained inside the vessel. This prevents air oxidation of the catalyst and also prevents possible explosive mixtures from forming due to a slow evolution of hydrogen which generally occurs for some time after freshly activated catalysts have been prepared.

Catalyst size has some effect on conversion efficiency, however catalyst size is generally fixed at least more or less approximately by other factors. The maximum size is determined by agitation considerations. Anything much bigger than 0.02 inches will require unusually high agitation power inputs. Material too small will not settle out readily for the decanting steps because of low settling velocities. As some attrition is expected, the largest size which can be easily suspended by agitation is preferred to maximize the attrition losses. Activation of a Raney copper catalyst can be achieved preferably at atmospheric pressures, although super- and sub-atmospheric pressures may be employed.

Each of the various process steps and optional steps utilized in one preferred mode of the practice of the present invention is illustrated by a box in FIG. 2. This FIG. 2 is believed to be largely self-explanatory to those of ordinary skill in the art, so that no separate or detailed description thereof is believed necessary or desirable herein. However, the boxes are joined together by heavy solid lines to show the proper sequence of process steps. Dotted interconnecting lines are used to show optional steps which may be used in the practice of the invention. Material inputs are shown by light solid lines entering the bottom portions of the respective step boxes involved, and material outputs are similarly shown by light solid lines leaving the upper portions of the respective step boxes involved. The dotted line rectangle in the lower portion of FIG. 2 indicates the process steps generally characteristically present when the present invention is practiced.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification and drawings.

EXAMPLE 1

In this Example, an apparatus as shown in FIG. 1 is employed. The reaction vessel, having an internal volume of approximately 120 gal., is charged with 93 gal. of soft water and 1385 grams of 50% gluconic acid. The agitator is started and 61.3 tbs. of copper/aluminum alloy granules are added to the vessel through the manway. The granules are 50% copper and 50% aluminum and have a 50 to 100 mesh particle size range.

The vessel is sealed and purged with nitrogen through the vent line to remove air.

A total of 204 tbs. of an aqueous 50% solution of sodium hydroxide is charged to the vessel. The first half of the solution is added at 0.15 lbs./minute and the second half of 0.45 lbs./minute. Total addition time is approximately 15 hours. Hydrogen is continuously generated and is vented from the vessel, which remains essentially at atmospheric pressure. Reaction temperature is maintained at 120°–125°F. by putting cooling water through the jackets.

After completing the sodium hydroxide addition the vessel contents are held at 120°–125°F. for 1 hour and subsequently cooled to 90°F. The agitator is stopped for 10–15 minutes to allow the catalyst to settle to the bottom of the vessel.

Nitrogen pressure is applied to the vessel and the spent leaching liquor in the vessel is removed through the lance projecting down from the top of the vessel to a level slightly above the catalyst. It is estimated that less than 4% of the spent liquor remains in the vessel as a liquid head above the catalyst. The liquor is highly alkaline (PH=14) and has a muddy appearance apparently due to finely divided, black particles of copper oxide.

The vessel is charged with 30–35 gal. of soft water. The agitator is run for 10–14 minutes, and then shut off for an additional 10–15 minutes to allow the particles to settle. The wash liquid is removed from the vessel through the lance as previously described.

This washing procedure is repeated until the pH of the final wash is reduced to 8.0.

The catalyst prepared by this procedure has a standardized acrylonitrile hydration activity greater than 70 weight percent.

The vessel is charged with soft water so that a total of 52 gallons of soft water are present in the reactor. The vessel pressure is reduced to 100mm by the vacuum pump and the vessel is subsequently blocked in by closing all valves. The agitator is subsequently started, and steam is applied to the jacket to raise the temperature of the water and catalyst to about 220°F.

A total of 233 lbs. of acrylonitrile are added to the vessel at a uniform rate over a 6 hour time interval. A sample taken at the end of the 6th hour of the addition period has one liquid phase, indicating the conversion level is at least about 50%. Temperature inside the vessel is maintained at 218° to 222°F. throughout the addition period.

After completing the addition, the vessel temperature is maintained at 218°–222°F. for an additional 7 hours. At this time a sample is withdrawn. Analysis of the sample by gas chromatography gives an acrylamide concentration of 37% by weight.

The product is stripped by reducing the vessel pressure to atmospheric by opening the valve to the condenser and subsequently applying steam to the jacket. The product is subsequently cooled to 90°F. by putting water through the jacket and another sample is withdrawn. The product contains 45% acrylamide and 0.1% acrylonitrile.

The agitator is stopped. After waiting 10 to 15 minutes the product solution is withdrawn through the same top-entering lance used in the catalyst preparation procedure by applying nitrogen pressure to the vessel. As the product is withdrawn it is passed through a filter to remove a small quantity of fine catalyst particles. A total of approximately 520 lbs. of product solution are withdrawn from the vessel. It is estimated 20–30 lbs. of product remain in the vessel.

The vessel is charged with 52 gallons of soft water, and the acrylonitrile hydration procedure is repeated. Substantially the same results are obtained.

EXAMPLE 2

The apparatus of Example 1 is used to prepare an acrylonitrile hydration catalyst.

The reaction vessel is charged with 96 gallons of soft water and 1231 grams of 50% gluconic acid. The agitator is started and 54.5 lbs. of 50 to 100 mesh granules of a copper/aluminum alloy are put into the vessel. The alloy has a composition of about 50% aluminum and 50% copper.

The vessel is sealed and purged with nitrogen through a vent line to remove air.

A total of 180 lbs. of an aqueous 50% solution of sodium hydroxide is charged to the vessel. The first half of the sodium hydroxide solution is added at 0.1 lbs./minute and the second half is added at 0.45 lbs./minute. Hydrogen is continuously generated during the reaction and is vented from the vessel, which remains essentially at atmospheric pressure. Reaction temperature is maintained at 122°–126°F. during most of the addition by putting cooling water through the jacket.

After completing the caustic addition, the vessel contents are cooled to 90°F and discharged from the vessel. The solid, coppercolored catalyst is repeatedly washed with water until the pH of the wash water is less than 8.0.

The catalyst has standardized acrylonitrile hydration activity greater than 70 weight percent.

EXAMPLE 3

The apparatus of Example 1 is used to hydrate acrylonitrile to acrylamide.

The vessel is charged with 52 gallons of soft water and 40 lbs. of wet catalyst, similar to the catalyst prepared in the previous example. The agitator is started and the vessel is sealed.

The vessel is purged with nitrogen for one-half hour. After purging, the vessel is evacuated to a total pressure of 100mm. Steam is applied to the jacket and the water temperature is raised to 220°F.

Acrylonitrile addition at a rate of approximately 0.65 lbs./minute is begun. The addition of acrylonitrile is continued at this rate until a total of 35 gallons have been added to the vessel. Cooling water is used throughout the addition to maintain temperature between 218° and 222°F. Samples taken every hour during the addition period are all single phase, indicating conversion is above about 50% at the end of the acrylonitrile addition. After completing the addition, the reaction mixture is held at the above conditions for approximately 7½ hours.

The vessel is subsequently vented through a valve at a controlled rate to a condenser. The vessel is maintained at approximately 220°F. by applying steam to the jacket. This procedure is continued for about 3 hours, until about 4½ gallons of condensate are collected.

The contents of the vessel are cooled to about 84°F. and the agitator is stopped. The catalyst particles settle to the bottom of the reactor, and 515 lbs. of product are recovered by decanting the liquid through a top entering lance equipped with a 90 mesh, sintered metal filter at its tip.

The product is analyzed by gas chromatography, and it is found to contain 41.1% acrylamide and 1.6% acrylonitrile. Byproducts are negligible. It is estimated the conversion of acrylonitrile to acrylamide is about 80%.

The product is subsequently polymerized to form a high quality latex polymer.

EXAMPLE 4

A 2 gallon agitated reaction vessel is charged with 10 lbs. of water, 413 lbs. of cupric oxide powder and 20 grams of a finely divided, 10% palladium on charcoal catalyst. The vessel is purged with oxygen and subsequently pressured with hydrogen to 100 PSIG. The pressure is maintained by continuously feeding hydrogen to the vessel through a pressure regulator. The temperature is maintained at 150° to 160°F. throughout the hydrogen addition.

After 20 hours the contents of the vessel are discharged. A solid metallic copper catalyst is recovered. The catalyst has a standardized acrylonitrile hydration greater than 50 weight percent.

The 2 gallon reaction vessel is subsequently charged with 9.0 lbs. of water and 1.0 lbs. of the catalyst prepared above. The vessel contents are heated to 230° to 235°F. A total of 3.0 pounds of acrylonitrile are added to the vessel at a substantially uniform rate over a 4 hour period while maintaining temperature from 230° to 235°F. The contents of the vessel are held for an additional 18 hours at 230° to 235°F.

Analysis of the final product indicates the conversion of acrylonitrile to acrylamide is higher than 70%, based on total acrylonitrile fed to the vessel.

EXAMPLE 5

A 3 liter glass resin flask is fitted with an agitator, thermometer, nitrogen purge inlet, hydrogen vent outlet, and an inlet for adding a 50% sodium hydroxide solution. A total of 2,300 cm$^3$ of water and 340 grams of copper-aluminum alloy granules are charged to the flask. The alloy is 50% copper and 50% aluminum and has particle sizes between 50 and 100 mesh. The flask is purged with nitrogen. A total of 1130 grams of a 50% sodium hydroxide solution are added to the flask. The first half is added at a substantially uniform rate over a 5 hour period, and the second half is added in approximately 1 hour.

A total of about 180 gms. of a 50 to 100 mesh catalyst, based on wet weight, are recovered. The catalyst has a standardized acrylonitrile hydration activity greater than 50 weight percent.

The 2 gallon reaction vessel of Example 4 is charged with 9.0 pounds of water and the total quantity of above said catalyst. The vessel is heated to 230° to 235°F. A total of 3.0 pounds of acrylonitrile are added to the vessel over a 4 hour period, while maintaining temperature between 230° and 235°F. The system is held in this temperature range for an additional 18 hours.

Analysis of the final product the conversion of acrylonitrile to acrylamide is higher than 70%, based on total acrylonitrile fed to the vessel.

EXAMPLE 6

The batch acrylonitrile hydration process is repeated five times in the manner described in Example 1 using the apparatus in FIG. 1. The fifth batch hydration procedure does not show any appreciable decline in conversions of acrylonitrile to acrylamide from the results in FIG. 1.

The total quantity of particle fines collected on the product filter described in Example 1 during the five batch acrylonitrile hydrations is estimated to be less than 5% of the total catalyst extimated to be initially present after the catalyst preparation as described in Example 1.

The claims are:

1. A process for catalytically hydrolyzing acrylonitrile to acrylamide comprising the steps of sequentially
    A. suspending in water contained in a reaction zone with agitation copper catalyst particles having a standardized nitrile hydrolysis activity of at least about 50 weight percent and further having a particle size ranging from about 0.002 to 0.1 inches in average diameters, the weight ratio of said water to said catalyst ranging from about 0.02 to 0.20,
    B. adding to said water while said catalyst particles are suspended therein at an initial water temperature ranging from about 180° to 300°F incrementally acrylonitrile with agitation, the rate of said addition being such that the temperature of said water is maintained in the range of from about 180° to 300°F., the total amount of acrylonitrile so added being such that the weight ratio of said water to said total acrylonitrile ranges from about 50:50 to 75:25, said rate of addition being such as to produce a total conversion of acrylonitrile to acrylamide in said reaction zone of at least about 45% at the time when said adding is completed,
    C. maintaining the resulting mixture in said reaction zone with agitation at a water temperature ranging from about 180° to 300°F until the total conversion of said acrylonitrile to produced acrylamide is at least about 65%,
    D. terminating said agitation in said reaction zone, thereby causing said catalyst particles to fall to the bottom of said reaction zone,
    E. removing at least a major portion of said acrylamide product solution from said reaction zone while retaining substantially all of said catalyst particles in said reaction zone,
    F. charging water to said reaction zone in an amount sufficient to bring the weight ratio of said water to said catalyst into said range of from about 0.02 to 0.20,
    G. repeating sequentially steps (A) through (F).

2. The process of claim 1 wherein said steps (A) through (F) are so sequentially repeated at least 5 times.

3. The process of claim 1 wherein said steps (A) through (F) are so sequentially repeated at least 10 times.

4. The process of claim 1 wherein said steps (A) through (F) are so sequentially repeated at least 15 times.

5. The process of claim 1 wherein the cycle time for steps (A) through (F) ranges from about 4 through 40 hours.

6. The process of claim 1 wherein the rate of addition of said acrylonitrile is such that steps (B) and (C) are practiced simultaneously and the total conversion of acrylonitrile to acrylamide in said raction zone is at least about 65%.

7. The process of claim 1 wherein initially prior to step (A) said process comprises the steps of
    A. charging water to said reaction zone,
    B. charging an alloy comprising copper and aluminum in a weight ratio of from about 30:70 to 70:30 copper to aluminum in the form of particles having a size ranging from about 0.002 to 0.1 inches in average maximum diameter to said reaction zone to produce an initial weight ratio of said alloy particles to said water in the range from about 0.01 to 0.35,
    C. suspending said alloy particles in said water with agitation,
    D. adding alkali metal hydroxide to such suspension while maintaining the bulk temperature of said water in the range from about 32° to 180° F., the total quantity of alkali metal hydroxide charged to such suspension ranging from about 0.5 to 20 times the number of moles of aluminum initially present in said alloy, the total time of such adding ranging from about 2 to 50 hours, E. terminating said agitation in said reaction zone, thereby causing said catalyst particles to fall to the bottom of said reaction zone,
F. removing said water with said alkali metal hydroxide contained therein, and
G. washing with water said catalyst particles until a wash water pH not above about 8.0 is achieved.

8. The process of claim 7 wherein after said adding is completed, the resulting solution of alkali metal hydroxide is maintained in contact with said particles while so suspended until at least about 35 weight percent of said aluminum initially present in said alloy on a 100 weight percent total initial alloy basis is removed thereby to produce catalyst particles from said alloy particles.

9. A process for catalytically hydrolyzing acrylonitrile to acrylamide comprising the steps of sequentially
A. suspending in water contained in a reaction zone with agitation Raney copper catalyst particles having a standardized nitrile hydrolysis activity of from about 70 to 95 weight percent and further having a particle size ranging from about 0.005 to 0.02 inches in average diameters, the weight ratio of said catalyst to said water ranging from about 0.05 to 0.1,
B. adding incrementally to said water acrylonitrile, while said catalyst particles are suspended therein at an initial water temperature ranging from about 200° to 250° F, the rate of said addition being such that the temperature of said water is maintained in the range of from about 200° to 250° F., the total amount of acrylonitrile so added being such that the weight ratio of said water to said total acrylonitrile ranges from about 60:40 to 70:30, said rate of addition being such as to produce a total conversion of acrylonitrile to acrylamide in said reaction zone of at least about 60% at the time when said adding is completed,
C. maintaining the resulting mixture in said reaction zone with agitation at a water temperature ranging from about 180° to 300° F. until the total conversion of said acrylonitrile to produced acrylamide is at least about 80%,
D. terminating said agitation in said reaction zone, thereby causing said catalyst particles to fall to the bottom of said reaction zone,
E. removing at least a major portion of said acrylamide product solution from said reaction zone while retaining substantially all of said catalyst particles in said reaction zone,
F. charging water to said reaction zone in an amount sufficient to bring the weight ratio of said catalyst to said water into said range of from about 0.05 to 0.1,
G. repeating sequentially steps (A) through (F).

10. The process of claim 9 wherein said steps (A) through (F) are so sequentially repeated at least 5 times.

11. The process of claim 9 wherein said steps (A) through (F) are so sequentially repeated at least 10 times.

12. The process of claim 9 wherein said steps (A) through (F) are so sequentially repeated at least 15 times.

13. The process of claim 9 wherein the cycle time for steps (A) through (F) ranges from about 8 through 20 hours.

14. The process of claim 9 wherein the rate of addition of said acrylonitrile is such that steps (B) and (C) are practiced simultaneously and the total conversion of acrylonitrile to acrylamide in said reaction zone is at least about 80%.

15. The process of claim 9 wherein initially prior to step (A) said process comprises the steps of
A. charging water to said reaction zone,
B. charging an alloy comprising copper and aluminum in a weight ratio of from about 40:60 to 60:40 copper to aluminum in the form of particles having a size ranging from about 0.005 to 0.02 inches in average maximum diameter to said reaction zone to produce an initial weight ratio of said alloy particles to said water in the range from about 0.01 to 0.35,
C. suspending said alloy particles in said water with agitation,
D. adding alkali metal hydroxide to such suspension while maintaining the bulk temperature of said water in the range from about 60° to 120° F., the total quantity of alkali metal hydroxide charged to such suspension ranging from about 1.0 to 3.0 times the number of moles of aluminum initially present in said alloy, the total time of such adding ranging from about 4 to 40 hours,
E. terminating said agitation in said reaction zone, thereby causing said catalyst particles to fall to the bottom of said reaction zone,
F. removing said water with said alkali metal hydroxide contained therein, and
G. washing with water said catalyst particles until a wash water pH not above about 8.0 is achieved.

16. The process of claim 15 wherein after said adding is completed, the resulting solution of alkali metal hydroxide is maintained in contact with said particles while so suspended until at least about 80 weight percent of said aluminum initially present in said alloy on a 100 weight percent total initial alloy basis is removed thereby to produce catalyst particles from said alloy particles.

* * * * *

UNITED STATES PATENT OFFICE
CERTIFICATE OF CORRECTION

PATENT NO. : 3,894,084
DATED : July 8, 1975
INVENTOR(S) : Darrell L. Werges and Louis A. Goretta It is certified that error appears in the above-identified patent and that said Letters Patent are hereby corrected as shown below:

Column 3, lines 26 and 50, change "standarized" to --standardized--

Column 8, line 56, change "400 Btu/lb" to --4,000 Btu/lb";

Column 8, line 64, change "13,500 lbs" to --6,750 lbs";

Column 8, line 66, change "NaOH/AI" to --NaOH/Al--.

Signed and Sealed this twenty-third Day of December 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,894,084　　　　　　　　　　Dated　July 8, 1975

Inventor(s)　Darrell L. Werges　et al.

It is certified that error appears in the above-identified patent and that said Letters Patent are hereby corrected as shown below:

Column 13, Claim 1, lines 64-65, "said water to said catalyst" should read -- said catalyst to said water --.

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*